Patented Oct. 3, 1939

2,174,707

UNITED STATES PATENT OFFICE 2,174,707

PROCESS FOR TREATING FRUIT POMACE

Enrico Prati, Asti, Calif.

No Drawing. Application November 3, 1937,
Serial No. 172,534

6 Claims. (Cl. 99—46)

This invention relates to wine making generally, especially to making of grape wines and has to do particularly with the handling and further treatment of the pomace or residual matter after pressing the juice from the crushed grapes or pressing the wine from the fermented crushed grapes, or "pomace."

The principal object of the invention is to provide a process for recovery of alcohol or brandy values from fruit and pomace resulting from wine making. Other features and advantages of the invention will appear in the following description.

Before describing the invention, an outline of the general wine making process includes the following variations:

A. From the fermenting tanks the grape "pomace" (skins, seeds and pulp) is carried to continuous or hydraulic presses by means of conveyors, press baskets, or hand dump carts. After the wine has been pressed out, the fermented pomace is piled up in any location near the winery premises, and then trucked to the fields and used for fertilizer. Such pomace however has practically no fertilizing value and all the alcohol contained in such pomace (average of 7%) is entirely lost.

B. *Unfermented white grape pomace.*—In the manufacture of white sweet fortified wines the free juice of the grapes is extracted as soon as the grapes are crushed. Then, the white (unfermented) pomace is pressed in the usual manner as fermented pomace; then it is washed with water and the entire diluted mixture is disposed of in the following method:

b—1. It may be fermented in tanks and after the fermentation is completed, the liquid is drawn off and pumped to the distillery for distillation purposes. The pomace remaining is then removed from the tanks by conveyors, labor, etc. and hauled by truck into the fields.

b—2. The entire mixture may be conveyed to a bunker with a screen bottom where the liquid in time separates from the pomace. The liquid is fermented without the pomace, and then is pumped to the distillery for distillation. The solid pomace is trucked away to the fields.

C. *Unfermented red grape pomace.*—In the manufacture of red fortified wines, practically the same process as above is followed with the only difference that the pomace is allowed to stay in contact with the juice until such time that the fermentation starts to extract the desired coloring matter.

By the present invention, from the fermenting tanks the fermented grape pomace is carried by conveyors to continuous presses where the wine is pressed out. The pressed pomace is carried and mixed with water by a cleat conveyor installed in a deep trough. A small quantity of water is added in order to soften the pomace. This mixture of pomace and water is continuously received in the trough, continuously mixed by the conveyor cleats, and continuously discharged into a hammermill. The hammermill converts the mixture, seeds as well, into a fine liquid condition about like pea or bean soup. This "soup" is then pumped directly into distilling material tanks, if fermented, or into the open fermenting tanks if not fermented, and in which latter case it is allowed to ferment and then pumped into the distilling material tanks.

From the distilling material tanks this liquid "soup" is pumped to a still charging tank from which by gravity it flows directly into a continuous still which continuously distills all the alcohol from the mass, the liquid distilled mass denuded of its alcohol being then run to waste.

The advantages of this process:

1. Saving in handling costs, labor, trucking, spreading, etc.

2. No loss of alcohol as in the generally used system. Every pound of pomace is distilled under this new system.

3. The distillation of the liquid "pomace" when carried out to make brandy, gives a finer grade of grape brandy because the real grape flavor and esters are extracted during the distillation.

While the process has been described in detail as applied to grape wine pomace, it may also be advantageously applied to any fruit or berry pomace and running it through a high speed hammermill as described. When using the process with peach peelings and culls, or with apricot pulp with the ultimate object of producing peach or apricot brandy, about 10 to 15% of the peach or apricot pits are included to impart the characteristic flavors of these fruits which are largely centered in their pits, and which flavors, by the processes heretofore in use, it was necessary to extract separately from the pits and add to the brandy previously distilled from the fermented juice of the pulp.

Pits, as of the peach and apricot, though large and hard, are completely reduced under the action of the hammermill as are the grape seeds, so that the mass, which includes sufficient water to make it fluid, will be of about the fluidity and consistency mentioned before running to the still, or still material feed tank, or fermenting tank, as the case may be, and free flowing throughout the process.

It is almost superfluous to add that where the fluid hammermill product is not yet fermented, that the fermentation may be carried on with or without the addition of yeast and/or sugar if desired.

It is also evident, especially in the making of brandy, that instead of adding water to the pomace and passing it through the hammermill, that sufficient of the residual wine may be used instead, or the fruit juice, if fermentation is to be carried out afterward.

Having thus described my improvement in the wine and brandy making art, it will be evident that the nature of the equipment used, and whether a hammermill or equivalent reducer is used, is limited only to producing the desired results as outlined, also that the distillation is carried out in a continuous type of still by the use of my improved process, and as the liquefied pomace is fluid enough to flow freely through the still, and if this process is adopted by the wine makers generally in this country alone, it will effect a saving of about one million gallons of alcohol annually which is now entirely lost both to industry as well as in tax returns to the Government.

My use of the word "liquid" in the appended claims is intended to cover the use of water, wine, fruit juice or mixtures thereof for grinding with the pomace, and my use of the words "fruit pomace" is intended to cover the use of any kind of fruits, fruit culls, peelings, skins, pits, and seeds, used in the process described.

Having thus described my invention, what I claim is:

1. The steps in the recovery of alcoholic values from fermented grape pomace by distillation which includes running the pomace together with some liquid through a suitable mill to reduce all to substantially liquid condition, and thereafter running the liquified mass through a continuous still while removing the alcohol therefrom.

2. The steps in the recovery of alcoholic values from grape pomace by distillation which includes running the pomace together with some liquid through a suitable mill to reduce all to substantially liquid condition, fermenting the liquified mass, and thereafter running the liquified mass through a continuous still while removing the alcohol therefrom.

3. In the making of wine from grapes, the steps in the recovery of alcoholic values from the grape pomace by distillation which includes separating the pomace from the fermented wine, running the pomace together with some liquid through a suitable mill to reduce all to substantially liquid condition, and thereafter running the liquified mass through a continuous still while removing the alcohol therefrom.

4. The steps in the recovery of alcoholic values from fruit pomace by distillation, which includes mixing liquid with the pomace and running the mixture through a suitable mill until all reduced to substantially liquid condition, fermenting the liquid mass, and thereafter running the liquified mass through a continuous still while removing the alcohol therefrom.

5. The steps in the recovery of alcoholic values from fermented fruit pomace by distillation, which includes mixing liquid with the pomace and running the mixture through a suitable mill until all reduced to substantially liquid condition, and thereafter running the liquified mass through a continuous still while removing the alcohol therefrom.

6. The steps in the recovery of alcoholic values from fermented fruit pomace by distillation, which includes running the pomace including from about 5 to 20% only of the fruit seeds, through a suitable mill together with some liquid, to reduce all to substantially liquid condition, and thereafter running the liquified mass through a continuous still while removing the alcohol therefrom.

ENRICO PRATI.